(12) United States Patent
Schmitt et al.

(10) Patent No.: US 11,332,609 B2
(45) Date of Patent: May 17, 2022

(54) EPOXY-FIBER REINFORCED COMPOSITES, METHOD TO FORM THE COMPOSITES AND EPOXY RESIN COMPOSITION USED THEREFOR

(71) Applicant: Dow Global Technologies LLC, Midland, MI (US)

(72) Inventors: Adam K. Schmitt, Midland, MI (US); David H. Bank, Midland, MI (US); Bharati Balijepalli, Midland, MI (US); Daniel Schneider, Waedenswil (CH)

(73) Assignee: Dow Global Technologies LLC, Midland, MI (US)

( * ) Notice: Subject to any disclaimer, the term of this patent is extended or adjusted under 35 U.S.C. 154(b) by 98 days.

(21) Appl. No.: 16/612,166

(22) PCT Filed: Mar. 22, 2018

(86) PCT No.: PCT/US2018/023734
§ 371 (c)(1),
(2) Date: Nov. 8, 2019

(87) PCT Pub. No.: WO2019/005237
PCT Pub. Date: Jan. 3, 2019

(65) Prior Publication Data
US 2021/0163732 A1    Jun. 3, 2021

Related U.S. Application Data

(60) Provisional application No. 62/526,695, filed on Jun. 29, 2017.

(51) Int. Cl.
| | | |
|---|---|---|
| C08L 63/04 | (2006.01) | |
| C08J 5/04 | (2006.01) | |
| C08L 63/00 | (2006.01) | |
| B32B 5/26 | (2006.01) | |
| C08G 59/26 | (2006.01) | |
| C08G 59/32 | (2006.01) | |
| C08G 59/38 | (2006.01) | |
| C08G 59/40 | (2006.01) | |
| C08G 59/68 | (2006.01) | |
| C08J 5/24 | (2006.01) | |

(52) U.S. Cl.
CPC ............ *C08L 63/04* (2013.01); *B32B 5/26* (2013.01); *C08G 59/26* (2013.01); *C08G 59/3218* (2013.01); *C08G 59/38* (2013.01); *C08G 59/4021* (2013.01); *C08G 59/686* (2013.01); *C08J 5/04* (2013.01); *C08J 5/042* (2013.01); *C08J 5/043* (2013.01); *C08J 5/24* (2013.01); *C08L 63/00* (2013.01); *B32B 2262/106* (2013.01); *B32B 2363/00* (2013.01); *B32B 2605/00* (2013.01); *C08J 2363/00* (2013.01); *C08J 2363/04* (2013.01); *C08J 2451/00* (2013.01); *C08J 2463/00* (2013.01); *C08J 2475/04* (2013.01); *C08L 2205/02* (2013.01); *C08L 2205/03* (2013.01); *C08L 2205/05* (2013.01); *C08L 2205/06* (2013.01)

(58) Field of Classification Search
None
See application file for complete search history.

(56) References Cited

U.S. PATENT DOCUMENTS

| | | |
|---|---|---|
| 3,313,747 A | 4/1967 | Schramm |
| 4,066,628 A | 1/1978 | Ashida et al. |
| 4,742,146 A | 5/1988 | Hefner, Jr. |
| 5,202,390 A | 4/1993 | Mulhaupt et al. |
| 5,278,257 A | 1/1994 | Mulhaupt et al. |
| 8,097,119 B2 | 1/2012 | Eagle et al. |
| 8,518,208 B2 | 8/2013 | Kohli |
| 2005/0022929 A1* | 2/2005 | Schoenfeld ............... C09J 5/06 525/523 |
| 2005/0070634 A1 | 3/2005 | Lutz et al. |
| 2005/0118734 A1 | 6/2005 | Mikawa |
| 2005/0209401 A1 | 9/2005 | Lutz et al. |
| 2006/0276601 A1 | 12/2006 | Lutz et al. |
| 2008/0188609 A1 | 8/2008 | Agarwal et al. |
| 2008/0251203 A1 | 10/2008 | Lutz et al. |
| 2009/0294057 A1* | 12/2009 | Liang ..................... C09J 163/00 523/438 |
| 2010/0108258 A1* | 5/2010 | Finter ..................... C09J 163/00 524/505 |
| 2011/0030893 A1* | 2/2011 | Kramer .............. C08G 18/2865 525/452 |
| 2013/0298794 A1* | 11/2013 | Shuto ..................... B41N 1/003 101/465 |
| 2015/0065606 A1 | 3/2015 | Matsuda et al. |
| 2015/0132566 A1 | 5/2015 | Ganglberger et al. |
| 2015/0210906 A1 | 7/2015 | Liang et al. |
| 2015/0240042 A1 | 8/2015 | Nguyen et al. |

FOREIGN PATENT DOCUMENTS

| | | |
|---|---|---|
| CA | 2510486 | 7/2004 |
| EP | 0308664 | 3/1989 |
| EP | 1632533 | 3/2006 |
| EP | 1920005 | 11/2011 |
| JP | 2010150310 | 7/2010 |

(Continued)

OTHER PUBLICATIONS

Michaud, V., et. al., "Low pressure processing of high fiber content composites," The 8th International Conference on Flow Processes in Composite Materials, 2006, p. 393-400.

(Continued)

*Primary Examiner* — Megan McCulley

(57) ABSTRACT

A resin composition is comprised of an epoxy resin comprised of a solid epoxy resin and a liquid polyurethane toughener that is dissolved in the epoxy resin and, upon curing of the liquid epoxy resin, the liquid polyurethane toughener phase separates into particles having a particle size of 50 nm to 2 micrometers, an epoxy hardener; and an epoxy soluble latent catalyst. The resin composition provides a more homogeneous infusion of the resin into a fibrous material for forming a prepreg and ultimately an epoxy fiber reinforced composition with improved toughness without sacrificing speed of impregnation or uniformity of the epoxy matrix within the composite.

19 Claims, No Drawings

(56) References Cited

FOREIGN PATENT DOCUMENTS

| WO | 2005118734 | 12/2005 |
|---|---|---|
| WO | 2013115152 | 8/2013 |
| WO | 2015011549 | 1/2015 |
| WO | 2015023615 | 2/2015 |
| WO | 2015047799 | 4/2015 |
| WO | 2016108958 | 7/2016 |
| WO | 2017066056 | 4/2017 |

OTHER PUBLICATIONS

Small, P. A., "Some Factors Affecting the Solubility of Polymers," J. Appl. Chem., 1953, p. 71-80, vol. 3.
Scott, J. M., et. al., "Carbon fibre composites with rubber toughened matrices," Journal of Materials Science, 1975, p. 551-562, vol. 10.
Hayes, Brian S., et. al., "Toughened Carbon Fiber Prepregs Using Combined Liquid and Preformed Rubber Materials," Polymer Engineering and Science, 2001, p. 170-177, vol. 41, No. 2.
Derkowski, B. J., et. al., "Morphology and Compression-After-Impact Strength Relationship in Interleaved Toughened Composites," Polymer Composites, 2003, p. 158-170, vol. 24, No. 1.
Aravand, Mohammadali, et. al., "Morphology and fracture behavior of POM modified epoxy matrices and their carbon fiber composites," Composites Science and Technology, 2015, p. 8-16, vol. 110.
Buchholz, U., et. al., "Compatibilized, Segmented Liquid Rubbers as Epoxy-Toughening Agents," Toughened Plastics II, 1996, p. 75-94, American Chemical Society.
"North America Epoxy Resin Guide," Olin Corporation, p. 1-12.

\* cited by examiner

EPOXY-FIBER REINFORCED COMPOSITES, METHOD TO FORM THE COMPOSITES AND EPOXY RESIN COMPOSITION USED THEREFOR

The present invention relates generally to epoxy-fiber reinforced composites and a method to make them. In particular, the invention is directed to toughened epoxy formulations and their use in forming fiber reinforced composites.

BACKGROUND

Fiber reinforced composites are increasingly being used in a wide variety of applications due to their relative low weight and high strength. An example of one such application is the automotive industry where there is a desire to improve fuel efficiency by reducing vehicle weight. Fiber reinforced composite structures provide a material having a lower density than a corresponding structure comprising a metallic alloy while retaining mechanical properties comparable with steel and aluminum.

Fiber reinforced composites comprise a resin matrix that is reinforced with fibers, such as carbon fibers. The matrix resin is commonly an epoxy resin. The fiber reinforced composites are typically prepared in a process in which a fabric or tow comprising fibers is impregnated with the resin to form a so called prepreg. Prepreg is commonly used to describe a reinforced composite comprising fibers that are impregnated with a resin that is in an uncured or partially cured state. The prepreg can then be molded into a final or semifinal molded part by subjecting the prepreg to conditions that cure the resin. Typically, heating is used to cure the prepreg in a mold at a temperature for a time sufficient to cure the resin.

The demands of the automotive industry require that the preparation of the molded parts be completed at the speed and automation typically seen in automotive plants. As a result, epoxy formulations for use in preparing a molded part must have relatively fast cure rates, and must be capable of being processed in an automated system. However, many epoxy formulations that are available today are not suitable for high volume processing and automated systems necessary in the automotive industry. Generally, the available epoxy resins have not had the requisite viscosity for quick and defect free impregnation to form the prepreg while still achieving a sufficient glass transition temperature (Tg) for the prepreg (uncured Tg) to allow handling of the prepreg without dimensional distortion. Likewise generally available epoxy resins have also lacked in providing sufficient cured Tg for the required dimensional stability in operation and toughness required from incidental impacts experienced by a typical auto body components (e.g., fenders, hoods and the like).

Accordingly, there still exists a need for improved epoxy formulations having rapid cure rates that can be used in high throughput manufacturing processes that addresses the limitations of the prior art such as those described above.

SUMMARY

Embodiments of the invention are directed to epoxy resin compositions that are particularly useful for preparing fiber reinforced composites that meet the demands associated with high speed automated manufacturing systems and the demands of applications in the automotive industry. In particular, embodiments of the present invention enable the realization of desirable characteristics which previously may have been at odds in the prior art such as relatively fast cure rates, low to negligible tack, low viscosity (good impregnation and low void volume in the epoxy fiber reinforced composite), and high cured and uncured glass transition temperature ($T_g$), and high toughness in the final fiber reinforced composite. These and additional advantages may be provided by epoxy resin compositions in accordance with embodiments of the present invention.

In addition to the desired properties noted above, it is important that fiber reinforced composites for use in certain industries, such as the automotive industry, must have mechanical properties that are similar to steel and aluminum. More specifically, the inventors have discovered that fiber reinforced composites having high $T_g$ and toughness following curing are particular useful in the production of articles and parts that are to be used in the automotive industry. In preferred embodiments, the present invention provides an epoxy resin composition that exhibits improved toughness following curing. As discussed in greater detail below, epoxy formulations having a lower degree of cross linking following curing generally have higher toughness at a given $T_g$.

A first aspect the invention is an epoxy resin composition comprised of at least one solid epoxy resin;
 a liquid polyurethane toughener that is dissolved in the epoxy resin and, upon curing of the epoxy resin, the liquid polyurethane toughener phase separates into particles having a particle size of 50 nm to 2 micrometers;
 an epoxy hardener; and
 an epoxy soluble latent catalyst.

It has been discovered that the use of the particular liquid polyurethane toughener may realize an epoxy resin composition having improved toughness, without sacrificing requisite low viscosity and cured and uncured Tg needed for high volume manufacturing applications of epoxy reinforced fiber composites. In a particular embodiment, the epoxy resin composition also contains a solid rubber toughener having a particle size between 25 to 500 nm. In a preferred embodiment the epoxy resin is comprised of the solid epoxy resin and at least one liquid epoxy resin and preferably the solid epoxy resin is an epoxy resin containing oxazolidone further described below.

A second aspect of the invention is a prepreg comprising the epoxy resin composition of the first aspect impregnated into a fibrous material wherein the fibrous material comprises greater than 50% of the prepreg by volume. In a further particular embodiment, the prepreg has a void volume of 1% or less.

A third aspect of the invention is an epoxy fiber reinforced composite comprising a cured epoxy resin matrix having therein reinforcing fibers, wherein the fibers comprise greater than 50% by volume of said composite and the epoxy resin matrix has a phase that is comprised of liquid polyurethane toughener that has been reacted with the epoxy resin matrix and said liquid polyurethane toughener has phase separated into particles ranging in size between 50 nm and 2 micrometers dispersed within the cured epoxy matrix.

DETAILED DESCRIPTION

The inventors have discovered that epoxy resin compositions that are compatible with making high volume epoxy reinforced composites may be further toughened and improved without sacrificing speed to manufacture or loss of Tg, which can commonly occur with typical epoxy resin toughening. It has been discovered that a liquid polyurethane toughener (PU toughener) if sufficiently compatible with the epoxy resin forms separate particulate domains within the cured epoxy resin that toughened the composite without, for example, compromising the impregnation of the fiber tows or mats with the resin. The compatibility or phase separation behavior upon curing may be a function of multiple factors such as the solubility within the epoxy resin, the amount of PU toughener present in the epoxy resin, the molecular weights of the epoxy resin and tougheners, particular chemistries, processing conditions (e.g., mixing and molding) and presence of other tougheners in the epoxy resin. To assess the solubility or compatibility of a particular toughener, solubility parameters may be employed such as those taught by P. A. Small, *Solubility of Polymers, J. appl. Chem.*, 3, February, 1953 ("Small"). Generally, the solubility parameter of the epoxy resin and the liquid polyurethane toughener as calculated by the method of Small should be such that the difference between the solubility parameters of the epoxy resin and the liquid polyurethane toughener should be at most about 1.1 and preferably at most about 1.

In contrast to toughening epoxy resins such as adhesive compositions, it has been discovered that the particle size of the PU toughener when making epoxy reinforced composites needs to be substantially smaller with a narrow size distribution. In particular, the phase separated PU toughener particles in the epoxy fiber reinforced composite needs to be less than 2 micrometers, and preferably less than 1.75, or 1.5 micrometer to about 50 nm. It is understood that the range contemplates a random PU toughener particle(s) being present in the composite that is larger than the upper size, but that any such particle is statistically insignificant by number (i.e., less than 5%, 3%, 2%, 1% or essentially none). Generally the median size is around 400 to 600 nm. The particle size may be determined by use of atomic force microscopy as detailed in the Examples on a 20×20 micrometer area.

Exemplary liquid polyurethane tougheners (PU toughener) are end capped and react into the epoxy resin upon curing. These tougheners are a liquid or low-melting elastomeric material (liquid at 100° C.) having isocyanate groups that are capped or blocked with, for example, an alcohol, a phenolic compound, an aminophenolic compound, a primary or secondary aliphatic or cycloaliphatic amine, a benzyl alcohol, an aromatic amine, a benzyl amine or a thiol compound. The capping or blocking group may contain additional functional groups such as phenols or aromatic amino groups, but the capping or blocking group may instead be devoid of such groups. Tougheners of these types and methods for preparing them are described, for example, in U.S. Pat. Nos. 5,202,390, 5,278,257, WO 2005/118734, U. S. Published Patent Application No. 2005/0070634, U. S. Published Patent Application No. 2005/0209401 and U. S. Published Patent Application 2006/0276601. The elastomeric portion of the PU toughener advantageously includes a polyether, polybutadiene or polyester segment. The polyether, polybutadiene or polyester segment may form part of a polyurethane and/or polyurea backbone.

The PU toughener preferably has a viscosity at 45° C. which is not greater than 1000 Pa·s and more preferably no more than about 800 Pa·s. Preferably, the weight average molecular weight of the toughener is about 8,000 or greater, and more preferably about 10,000 or greater. Preferably, the molecular weight of the toughener is about 70,000 or less, and more preferably about 40,000 or less. Molecular weights as used herein are determined according to gel permeation chromatography (GPC) analysis. Surprisingly, the use of the PU toughener may realize an epoxy resin composition that has the same or lower viscosity than the same epoxy resin composition in the absence of the PU toughener. Generally, the epoxy resin composition has a viscosity of at most about 100 Pa·s at 100° C. and preferably at most about 80 Pa·s and most preferably at most about 60 Pa·s.

The PU toughener preferably contains an average of no more than 6 blocked or capped terminal groups per molecule. Preferably the average number of such groups is at least 1, more preferably at least 2, up to about 4 per molecule.

The PU toughener is preferably non-crosslinked or lightly crosslinked, preferably having a crosslink density of about 2 or less and preferably about 1 or less. Crosslink density is the number of attachments between chains of polymers.

A preferred class of PU tougheners includes those corresponding to Formula I:

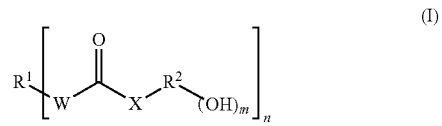

wherein m is 1 or 2, n is 2 to 6, $R^1$ is an n-valent radical of an elastomeric prepolymer after the removal of the terminal isocyanate, amino or hydroxyl group(s), the elastomeric prepolymer being soluble or dispersible in epoxy resin, W and X are independently —O— or —$NR^3$—, at least one of W and X being —$NR^3$—, $R^2$ is an m+1-valent radical of a polyphenol or aminophenol after the removal of a phenolic hydroxyl group when X is —O— and of the amino group when X is —$NR^3$—, and $R^3$ is hydrogen, a $C_1$ to $C_6$ alkyl or phenyl. Such tougheners are described in more detail in EP-A-0 308 664 (page 5, line 14, to page 13, line 24), and in U.S. Pat. No. 5,278,257 (at column 2, lines 14 to 33 and column 4, line 19 and column 16, line 18), the disclosures of which are incorporated herein by reference.

Other PU tougheners correspond to Formula II and/or Formula III:

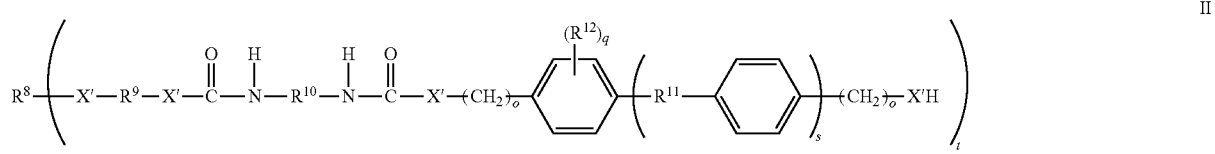

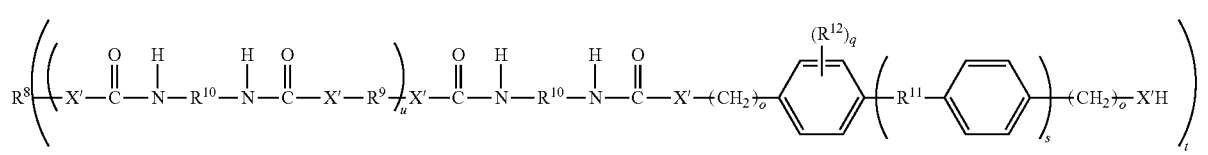

wherein $R^8$ is independently in each occurrence a $C_{2-20}$ m-valent alkyl moiety; $R^9$ is independently in each occurrence a polyether chain; $R^{10}$ is independently in each occurrence an alkylene, cycloalkylene or mixed alkylene and cycloalkylene moiety, optionally containing one or more oxygen or sulfur atoms; $R^{11}$ is a direct bond or an alkylene, carbonyl, oxygen, carboxyloxy, or amido moiety; $R^{12}$ is independently in each occurrence an alkyl, alkenyl, alkoxy, aryloxy or aryloxy moiety with the proviso that if s=1, then q=0; X' is O or —$NR^{13}$ with the proviso that X' is O where s is 1; and that where s is 0, X' is O in at least one occurrence; $R^{13}$ is independently in each occurrence hydrogen or alkyl; t is independently in each occurrence a number of about 1 to about 6; u is independently in each occurrence a number of 1 or greater; o is independently in each occurrence 0 or 1 if s is 0 and 0 if s is 1; s is independently in each occurrence 0, or 1; and q is independently in each occurrence a number of from 0 to 1.

Still another useful class of PU tougheners corresponds to formula IV:

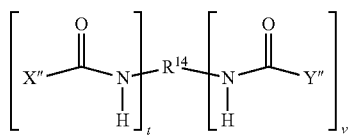

IV wherein $R^{14}$ is the elastomeric prepolymer residue after removal of isocyanate groups, said residue having a valence of t+v=2 to 6 with t=1 to 6 and v=0 to 5, X" is the residue of the primary or secondary aliphatic, cycloaliphatic, heteroaromatic and/or araliphatic amine, a thiol and/or an alkyl amide after removal of an amine or thiol hydrogen and Y" is the residue of the phenol and/or the polyphenol after removal of a phenolic hydrogen.

Preferred PU tougheners are isocyanate-terminated prepolymers formed from a polyether polyol and an aliphatic polyisocyanate, in which the terminal isocyanate groups are blocked with a phenol, aminophenol, polyphenol or an allylphenol such as o,o-diallyl bisphenol A or 2 allylphenol.

The PU toughener is present in a sufficient amount to improve the toughness of an epoxy reinforced composite made therefrom, without deleteriously affecting the impregnation of the epoxy composition when forming a prepreg or substantially reducing the cured or uncured Tg. Preferably, the PU toughener is present in an amount of about 1% by weight of the epoxy resin composition or greater, to 7.5%. It has been discovered that too much toughener may cause the particle size to increase and the performance of the resultant composite properties to be unimproved as well as causing the viscosity to increase making it more difficult to form the prepregs quickly.

In an embodiment, it has been discovered that it may be desirable to include a second toughener with the PU toughener, and in particular a core shell rubber in the epoxy resin composition. The core-shell rubber is a solid particulate material having a rubbery core. The rubbery core preferably has a Tg of less than −20° C., more preferably less than −50° C. and even more preferably less than −70° C. The Tg of the rubbery core may be well below −100° C. The core-shell rubber also has at least one shell portion that preferably has a Tg of at least 50° C. By "core", it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material is preferably grafted onto the core or is crosslinked. The rubbery core may constitute from 50 to 95%, especially from 60 to 90%, of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethylhexylacrylate. The core polymer may in addition contain up to 20% by weight of other copolymerized mono-unsaturated monomers such as styrene, vinyl acetate, vinyl chloride, methyl methacrylate, and the like. The core polymer is optionally crosslinked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below −100° C. Core-shell rubbers having a silicone rubber core include those commercially available from Wacker Chemie, Munich, Germany, under the trade name Genioperl™.

The shell polymer, which is optionally chemically grafted or crosslinked to the rubber core, is preferably polymerized from at least one lower alkyl methacrylate such as methyl-, ethyl- or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer is generally between 20,000 and 500,000.

A preferred type of core-shell rubber has reactive groups in the shell polymer which can react with an epoxy resin or an epoxy resin hardener. Glycidyl groups such as are provided by monomers such as glycidyl methacrylate are suitable.

A particularly preferred type of core-shell rubber is of the type described in EP 1 632 533 A1. Core-shell rubber particles as described in EP 1 632 533 A1 include a crosslinked rubber core, in most cases being a crosslinked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in EP 1 632 533 A1.

Preferred core-shell rubbers include those sold by Kaneka Corporation under the designation Kaneka Kane Ace, including Kaneka Kane Ace MX core shell rubbers and in particular MX 153 and 154. The products contain the core-shell rubber particles pre-dispersed in an epoxy resin, at a concentration of approximately 25% to 40%. The epoxy resin contained in those products will form a portion of the liquid epoxy resin in the epoxy resin composition.

The core-shell rubber particles can constitute from 1 to 8% by weight percent of the epoxy resin composition. Desirably, the core shell rubber particles preferably constitute at least 2 weight %, or at least 2.5 weight % to at most 7.5% of the epoxy resin composition.

The epoxy resin composition is comprised of a solid epoxy resin that may be any known epoxy resin that facilitates the achievement of the desired cured and uncured Tg and impregnation of a fiber two or mat to form a prepreg. In an embodiment the solid epoxy resin is an epoxy resin containing an oxazolidone.

Preferably, the solid epoxy resin comprises an epoxy terminated polyoxazolidone resin. It has been discovered when using a polyoxazolidone resin in combination with the PU toughener realizes particularly improved toughening useful for structural composites such as autobody panels. Illustratively when using these resins the phase separation behavior of the PU tougheners and the final cured composite properties are particularly enhanced when the PU tougheners have a composition as described herein such that the particle size is realized. Epoxy terminated polyoxazolidone resins are a reaction product formed by reacting a polyepoxide compound with a polyisocyanate compound. A representative chemical structure of such an oxazolidone is shown below in Formula I:

bisphenol A) and diglycidyl ether of 2,2-bis(3,5-dibromo-4-hydroxyphenyl) propane (generally referred to as tetrabromobisphenol A) and any mixture thereof.

The polyisocyanate compound useful to form the epoxy resin containing oxazolidone may be represented by the following general formula: $(O=C=N)_m$—R wherein R is a substituted or unsubstituted aliphatic, aromatic or heterocyclic polyvalent group and m has an average value of greater than about 1 to less than about 5, preferably from about 1.5 to about 4, most preferably from about 2 to about 3. Examples of suitable polyisocyanates include 4,4'-methylene bis(phenylisocyanate) (MDI) and isomers thereof, higher functional homologs of MDI (commonly designated as "polymeric MDI"), toluene diisocyanate (TDI) such as 2,4-toluene diisocyanate and 2, 6-toluene diisocyanate, m-xylylene diisocyanate, hexamethylene diisocyanate (HMDI) and isophoronediisocyanate or any mixture thereof.

Formula I

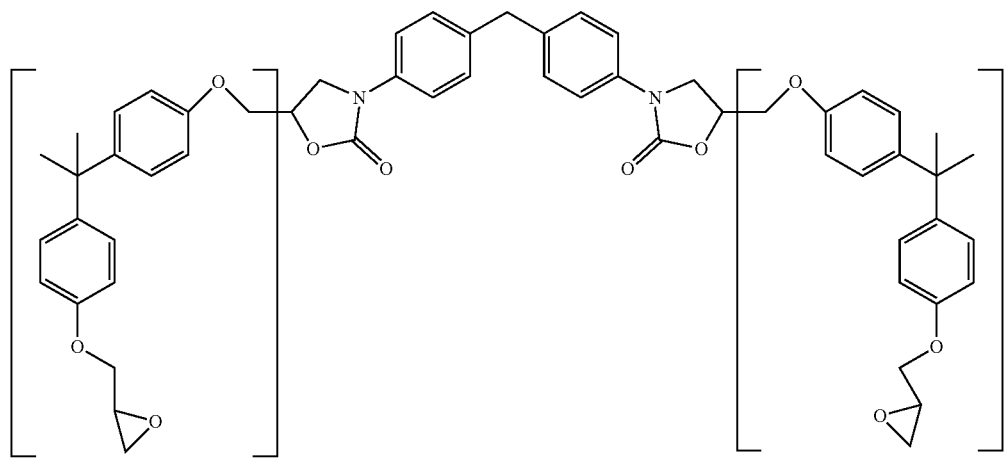

The polyepoxide compound useful to form the epoxy resin containing oxazolidone compound possesses more than one 1,2-epoxy group. In general, the polyepoxide compound is a saturated or unsaturated aliphatic, cycloaliphatic, aromatic or heterocyclic compound which possesses more than one 1,2-epoxy group. The polyepoxide compound can be substituted with one or more substituents which are non-reactive with the isocyanate groups such as lower alkyls and halogens. Such polyepoxide compounds are well known in the art.

Illustrative polyepoxide compounds include those described in the Handbook of Epoxy Resins by H. E. Lee and K. Neville published in 1967 by McGraw-Hill, New York and U.S. Pat. No. 4,066,628, both are incorporated herein in their entireties by reference.

Particularly useful polyepoxide compounds have the following general formula

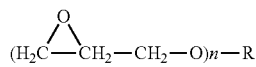

wherein R is substituted or unsubstituted aromatic, aliphatic, cycloaliphatic or heterocyclic polyvalent group, and n has an average value of from greater than about 1 to less than about 5. The preferred diepoxides include diglycidyl ether of 2,2-bis(4-hydroxy-phenyl) propane (generally referred to as Other suitable polyisocyanate compounds are described in U.S. Pat. Nos. 3,313,747; 4,066,628 and 4,742,146, which are incorporated herein in their entireties by reference. Preferred polyisocyanate compounds are 4,4'-methylene bis (phenylisocyanate) (MDI) and isomers thereof, polymeric MDI and toluene diisocyanate (TDI). The most preferred polyisocyanate compounds are 4,4'-methylene bis(phenylisocyanate), isomers thereof and polymeric MDI.

A suitable catalyst is employed in the present invention to facilitate reaction of the polyepoxide compound with the polyisocyanate compound to form the aforementioned epoxy resin containing oxazolidone. Examples of suitable catalysts include zinc carboxylate, organozinc chelate compound, trialkyl aluminum, quaternary phosphonium and ammonium salts, tertiary amines and imidazole compounds. The preferred catalysts are imidazole compounds. Particularly, preferred catalysts are 2-phenylimidazole 2-methylimidazole, 1-methylimidazole, 2-ethyl-4-methylimidazole and 4,4'-methylene-bis(2-ethyl-5-methylimidazole). The catalyst is generally employed in an amount of from about 0.01 to about 2, preferably from about 0.02 to about 1, most preferably from about 0.02 to about 0.1, weight percent based on the combined weight of the polyepoxide compound and polyisocyanate compound used.

Examples of suitable epoxy resins containing an oxazolidone are available from Olin Corporation under product names D.E.R.™ 6508 or D.E.R.™ 6510.

It has been found that the use of an epoxy-terminated polyoxazolidone in the epoxy resin composition of the present invention helps reduce the tackiness of the epoxy resin composition and the resultant composite precursors, such as prepregs, while still maintaining high $T_g$ values of the cured compositions and cured composites. Low to negligible tack is a desirable property for preparing fiber reinforced composites that are used in automated manufacturing processes, such as those typically used in the automotive industry. The reason for this is several fold. First, in many circumstances it may be desirable to prepare the prepreg (e.g., the uncured composite precursor) at a site that is remote from the location or facility where final molding and assembly of an article prepared from the prepreg is performed. In such cases, sheets of the prepreg may be prepared by infusing the epoxy resin composition into a fibrous material, for example, tows or fabrics formed from reinforcing fibers, to form a prepreg which may then be packaged, stored, or shipped for future use. To meet this requirement it is important that prepregs prepared from the epoxy resin composition have low tack so that the prepregs may be easily handled and unpackaged without self-sticking of the prepregs. Second, low to negligible tack is also important to help prevent the epoxy resin composition from adhering to the automated equipment and mold during the process of molding the prepreg into an article or part. Having low tack will allow the prepregs to be cut, picked up and placed, and stacked without sticking to tables, grippers, equipment, or other materials. Avoidance of self-sticking of the prepregs during handling can also be beneficial because it may permit adjusting placement of prepreg layers during automated layup. Likewise, the use of the epoxy-terminated polyoxazolidone has been found to be compatible with the PU tougheners as described above without substantially altering the desirable Tg behavior of the epoxy resin, while substantially toughening the final epoxy fiber reinforced composite.

In general, tackiness is a function of $T_g$ and molecular weight of the combination of resins in the composition. Therefore, to reduce tackiness at ambient temperatures, the inclusion of some fraction of component resins with $T_g$ above ambient temperature in the composition is desirable. Higher molecular weight of the resin can further reduce tackiness, in particular the rate at which two surfaces stick together. Solid epoxy resins have $T_g$ above ambient room temperature and have higher molecular weight than those of liquid epoxy resins. Therefore, inclusion of some further fraction of solid epoxy resins in the composition may be desirable for reducing tackiness.

Epoxy formulations having low tack are typically associated with a $T_g$ that is above ambient room temperature. However, such a $T_g$ may not sufficiently infuse into the fibrous matrix during prepreg formation. In general, epoxy resin compositions that provide excellent infusion tend to have an uncured glass transition temperature ($T_{g,0}$) that is too low to provide the desired low tack. Similarly, epoxy resin compositions which provide sufficiently low tack tend to have a $T_{g,0}$ which is too high to provide the required fiber infusion.

In embodiments of the present invention, the epoxy resin composition is formulated to have a $T_{g,0}$ that is sufficiently low to provide a desired rate of infusion during the prepregging process. Infusion of the epoxy resin composition into the fibrous matrix is particularly important for preventing or reducing the presence of void spaces in the prepreg.

To help reduce tack following infusion, the prepreg may then be subjected to conditions that result in partial curing of the epoxy resin composition. For example, the infused prepreg may be subjected to conditions that cause partial reaction of the epoxy resin composition. This in turn, increases the glass transition temperature of the prepreg ($T_{g,p}$) and thereby produces a prepreg having sufficiently low tack for further processing. The increase in the $T_g$ of the epoxy resin composition from an initial $T_{g,0}$ to a higher $T_{g,p}$ is preferably carried out during the prepregging process itself, but can also be carried out to equal effect in a separate process after prepregging.

Advancement from $T_{g,0}$ to $T_{g,p}$ may be accomplished by exposing the epoxy resin composition to an elevated temperature for a sufficient amount of time to achieve the desired degree of reaction. The appropriate time and temperature depend on the desired degree of advancement and the cure kinetics of the resin composition, which in turn depends on variables such as latent hardener level, latent catalyst level, and the types and amounts of the epoxy resin components. For example, for a dicyandiamide cured epoxy resin compositions, approximately 1 percent reaction corresponds to an increase in $T_{g,0}$ of approximately 1.1° C.

Although as mentioned the time and temperature required for a given degree of advancement depend on the specific resin composition, the following time/temperature combinations indicate approximately what is required to increase $T_{g,0}$ by 5° C.: heating the prepreg for 480 seconds at 107° C., 240 seconds at 116° C., 120 seconds at 125° C., and 60 seconds at 134° C. Such an additional heating step (referred to herein as an advancement) may be readily accomplished as part of the prepregging process itself. Separate processes after prepregging which are suitable for controlled advancement include roll-to-roll processes where the prepreg is unspooled, exposed to heat, and respooled; and batch processes such as storage of rolls of prepreg for prescribed time in a temperature-controlled room.

Preferably, to achieve desired infusion during prepregging, the starting epoxy resin composition has a $T_{g,0}$ from 5° C. to 10° C. In general, epoxy resin compositions in accordance with embodiments of the invention have an uncured $T_g$ of less than 20° C. Preferably, the epoxy resin composition has an uncured $T_g$ that is from 0 to 20° C., and more preferably, from 5 to 15° C., and more preferably, from 5 to 10° C. Glass transition temperatures of the epoxy resin compositions can be measured with a TA Instruments Q2000 differential scanning calorimeter (DSC).

Following production of the prepreg, the prepreg may be exposed to reaction conditions to induce partial reaction of the epoxy resin composition. Preferably, the epoxy resin composition of the prepreg has a $T_{g,p}$ that is from 10 to 30° C., preferably from 12 to 25° C., and more preferably from 12 to 20° C. The degree of advancement, defined as $T_{g,p}$-$T_{g,0}$, is preferably 20° C. or less, more preferably 15° C. or less, and even more preferably 10° C. or less.

Following full curing, the epoxy resin composition preferably has a $T_g$ that enables articles and parts that are molded to be removed from a mold (in the presence of internal or external mold release agent) at cure temperature without warping. This in turn may help increase the throughput of fiber reinforced composite production because it allows the molded article or part to be removed from the mold without having to wait for the molded article or part to cool. For instance, if a material can be compression molded at 150° C. such that a $T_g$ greater than the molding temperature results (e.g., $T_g$=155° C.), then the material can be demolded at the compression molding temperature. High $T_g$ after cure can also be beneficial for improved heat resistance in the final application. High $T_g$ after cure may also provide less creep and better dimensional stability at above-ambient use temperatures and at high temperatures that might be required for curing of coatings. Following curing, epoxy resin compositions in accordance with embodiments of the present invention preferably have a $T_g$ that is from 140 to 165° C., and more preferably, from 150 to 165° C., and more preferably, from 150 to 160° C.

A wide range of epoxy resins may be suitable for the liquid epoxy resin. Examples of suitable epoxy resins may include the diglycidyl ethers of polyhydric phenol compounds such as resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol, diglycidyl ethers of aliphatic glycols and polyether glycols such as the diglycidyl ethers of $C_{2-24}$ alkylene glycols and poly(ethylene oxide) or poly(propylene oxide) glycols; polyglycidyl ethers of phenol-formaldehyde novolac resins, alkyl substituted phenol-formaldehyde resins (epoxy novalac resins), phenol-hydroxybenzaldehyde resins, cresol-hydroxybenzaldehyde resins, dicyclopentadiene-phenol resins and dicyclopentadiene-substituted phenol resins, and any combination thereof. Suitable diglycidyl ethers include diglycidyl ethers of bisphenol A resins such as are sold by Olin Corporation d61 and D.E.R.® 662 resins.

Commercially available diglycidyl ethers of polyglycols include those sold as D.E.R.® 732 and D.E.R.® 736 by Olin Corporation.

Epoxy novolac resins may also be used. Such resins are available commercially as D.E.N.® 354, D.E.N.® 431, D.E.N.® 438 and D.E.N.® 439 from Olin Corporation.

In a preferred embodiment, the liquid epoxy resin comprises a liquid epoxy resin and an epoxy novolac resin. For example, in one embodiment of the epoxy resin composition the second epoxy component comprises a liquid epoxy resin that is a diglycidyl ether of bisphehol A, and an epoxy novolac resin that is a polyglycidyl ether of a phenol-formaldehyde novolac.

The amount of the solid epoxy resin may range from about 10 to 65 weight percent, and in particular, from about 15 to 55 weight percent, and more particularly, from about 20 to 45 weight percent based on the total weight of all epoxy resins in the epoxy resin composition. In a preferred embodiment, the amount of the solid epoxy resin in the epoxy resin composition is from 25 to 43 weight percent total weight of all epoxy resins in the epoxy resin composition.

The amount of the liquid epoxy components in the epoxy resin composition may range from about 35 to 90 weight percent, and in particular, from about 45 to 85 weight percent, and more particularly, from about 55 to 75 weight percent based on the total weight of all epoxy resins in the epoxy resin composition.

In particular embodiments, the liquid epoxy resin comprises a combination of an diglycidyl ethers epoxy resin (e.g., diglycidyl ether of bisphenol A) and an epoxy novolac resin. In one embodiment, the diglycidyl ethers of bisphenol A epoxy resin is present in an amount 0 to 65 weight percent and an epoxy novolac resin that is present in an amount of from 0 to 70 weight percent total weight of all epoxy resins in the epoxy resin composition. Preferably, the diglycidyl ether resin is present in an amount 10 to 40 weight percent and the epoxy novolac resin is present in an amount of from 15 to 62 weight percent based on the total weight of all epoxy resins in the epoxy resin composition. In a preferred embodiment, the a diglycidyl ether liquid epoxy resin is present in an amount 15 to 30 weight percent and an epoxy novolac resin that is present in an amount of from 25 to 46 weight percent based on the total weight of all epoxy resins in the epoxy resin composition.

The epoxy resin composition also is comprised of an epoxy hardener such as those known in the art. The hardener causes the adhesive to cure (cross-link) when heated to a temperature of at least 80° C., preferably at least 100° C. or greater, but does not cause the adhesive to cure or the adhesive cures very slowly at room temperature (about 22° C.) or even at temperatures up to at least 50° C. Suitable hardeners include boron trichloride/amine and boron trifluoride/amine complexes, dicyandiamide, melamine, diallylmelamine, guanamines such as acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. The use of dicyandiamide, isophthalic acid dihydrazide, adipic acid dihydrazide and 4,4'-diaminodiphenylsulphone is particularly preferred.

In a preferred embodiment the hardener is a micronized latent hardener such as dicyandiamide. Typically the micronized latent hardener has a particle distribution in which 98% of the particles have a maximum particle diameter that is less than 10 microns and where at least 35% of particles have a particle diameter that is less than 2 microns provides for a faster cure rate of the epoxy resin composition. As noted previously, fast cure rates are particularly desirable in automated applications where high throughput in the production of molded articles and parts is required.

While not being bound by theory, it is believed that during the infusion of an epoxy resin into the fibrous material to form the prepreg, the fibrous material may actually function as a filter that prevents particles from being infused past the outer surface fibers of the fibrous material if the particles are too large. Such particles may include any solid rubber tougheners, PU tougheners that phase separate prior to full impregnation into the fiber two or mat, or solid latent hardeners such as the dicyandiamide particles described above.

Preferably, the latent hardener has a particle distribution in which 98% of the particles have a maximum particle diameter that is less than 6 microns, and more preferably, 98% of the particles have a maximum particle diameter that is less than 4 microns. Preferably, at least 45% of the particles having a diameter of less than 2 microns, and more preferably, at least 55% of the particles having a diameter of less than 2 microns, and even more at least 90% of the particles having a diameter of less than 2 microns. In a preferred embodiment, 100% of the particles have a diameter of less than 2 microns. The particle size can be measured with a laser diffraction system, such as the Beckman Colter LS 13-320 Laser Diffraction Particle Size Analyzer equipped with the Tornado Dry Powder System.

Examples of latent hardeners that may be used in embodiments of the present invention include dicyandiamide and guanamines, such as acetoguanamine and benzoguanamine. Preferably the latent hardener comprises dicyandiamide. A suitable dicyandiamide latent hardener that may be used in embodiments of the invention is available from Alzchem under the product name DYHARD® SF100.

Most commercially available dicyandiamide hardeners have particle distributions where the average particles sizes are well above 2 microns. For example, Alzchem's literature describes that the dicyandiamide available under the product name DYHARD® SF100 has a particle distribution in which 98% of the particles have a diameter between 5.2 and 5.8 microns. Thus, to provide a latent hardener having a desired particle size distribution it may be necessary to further process the hardener, for example, by milling or grinding, to produce a particle distribution in which at least 35% of particles have a particle diameter that is less than 2 microns.

The latent hardener in the epoxy resin composition is present in an amount that is sufficient to cure the epoxy resin. In one embodiment, the latent hardener is present in an amount relative to the total amount of epoxy resins in the composition corresponding to an epoxy/hardener equivalent ratio from 0.5 to 3 where the equivalent ratio is calculated by:

$$\frac{(mepoxy/EEW)}{(mhardener/HEW)}$$

where mepoxy is the mass of epoxy resin, EEW is equivalent weight per epoxy group of the epoxy component blend, mhardener is the mass of the hardener, and HEW is the equivalent weight per active hydrogen of the hardener blend. Preferably the epoxy/hardener equivalent ratio is 0.75 to 2, more preferably 0.9 to 1.1, and most preferably 1.

In terms of weight percent, the amount of latent hardener in the epoxy resin composition is typically between 5 and 15 weight percent based on the total weight of the epoxy resin composition, and more typically from about 6 to 12 weight percent. In a preferred embodiment, the amount of latent hardener in the epoxy resin composition is between 7 and 8 weight percent, based on the total weight of the epoxy resin composition.

By using a latent hardeners and tougheners having the desired particle size a more homogeneous infusion of the epoxy resin composition into the fibrous material may be achieved. In turn, this provides an epoxy resin composition having faster cure rates, which reduces mold cycle times, and thereby increases the rate at which articles and parts molded from prepregs may be prepared.

The epoxy resin composition also includes a latent catalyst that is soluble in the epoxy resins of the composition. For a solubilized catalyst to be latent generally requires that the latency comes directly from the chemical structure of the catalyst. For example, such a latent catalyst may include a blocked catalyst where the actual catalytically active species is not present until generated by an unblocking reaction that occurs at high temperatures, which are typically used during molding of the prepreg.

As used herein, the term "soluble" with respect to the latent catalyst requires that the catalyst be substantially dissolved in the epoxy resin composition prior to infusion of the epoxy resin composition into the fibrous material. Substantially dissolved means that greater than 90% of the catalyst, and preferably greater than 95%, and most preferably 100% of the catalyst is dissolved in the epoxy resin composition. Typically, it is desirable to dissolve the catalyst in the epoxy resin composition during mixing of the epoxy resin composition.

The amount of the latent catalyst in the epoxy resin composition is at a level of 1 to 7 parts per hundred parts epoxy resin (PHR of catalyst=100 $(m_{catalyst}/m_{epoxy})$, where $m_{catalyst}$ is the mass of the catalyst and $m_{epoxy}$ the mass of the epoxy resin. In a preferred embodiment, the latent catalyst is present in an amount from 2 to 6 PHR, and more preferably, from 3 to 5 PHR.

Examples of latent catalysts that may be used in embodiments of the present invention include substituted urea and/or modified imidazole (e.g., 2-phenyl-imidazole, 2,4-diamino-6-[2'-methylimidazolyl-(1')]-ethyl-s-triazine, 2,4-diamino-6-[2'-methyl imidazolyl-(1')] ethyl s triazine isocyanuric acid adduct dehydrate). In a preferred embodiment, the soluble latent catalyst are blocked urea catalysts which are latent and which are soluble in the epoxy resin. An example of a suitable latent catalyst that may be used in embodiments of the present invention is toluene bis-dimethyl urea ("TBDMU").

As previously discussed, toughness of the cured fiber reinforced composite may be of particular concern in certain applications. For example, in the production of automotive parts, it is important that parts comprising a molded fiber reinforced composite must have mechanical properties comparable or better than a similar part formed from steel or aluminum. Embodiments of the present invention have improved toughness compared to composites without the PU tougheners and in particular without the combination of the PU tougheners and solid core shell rubber tougheners.

Depending upon the end application, the epoxy resin composition may also include additional components, such as water, solvents, dispersants, inorganic fillers, mold release agents, flow aids, additional additives for specific functionality, such as wetting agents and/or reactive diluents. In a preferred embodiment, the epoxy resin composition includes a mold release agent. An example of a suitable release agent is an ester of montanic acid, which is available from Clariant under the product name LICOWAX® E.

In preferred embodiments of the invention, the present invention is directed to epoxy resin compositions that may be used in high volume automated manufacturing processes for the production of automotive articles and parts. In particular, embodiments of the invention may be used to produce structural components in automobiles that can be used to replace parts conventionally made from steel or aluminum. As noted above, to be used for such structural components, the prepregs must be capable of being used in automated systems and the resulting fiber reinforced composite parts must have sufficient mechanical properties to not only withstand the day-to-day wear that is normally encountered in automotive vehicles, but also meet safety requirements that are mandatory in modern automobiles.

Epoxy resin compositions in accordance with embodiments of the invention may be prepared by mixing the various epoxy components together at an elevated temperature for a sufficient amount of time to completely dissolve all of the epoxy resins. In one embodiment, the solid epoxy resin is added to a preheated mixture of the liquid epoxy resin and is then mixed for a sufficient amount of time to dissolve the first epoxy component. Typically, the epoxies are mixed at a temperature between 100 and 130° C., with a mixing temperature of 120° C. being preferred. Mixing speeds may range from 1,000 to 4,500 rpm, and in particular, from 2,500 to 3,500 rpm with a mixing speed of 3,000 rpm being preferred. The epoxy components are preferably mixed until a homogeneous epoxy mixture is obtained.

Following mixing of the epoxy resins, the epoxy mixture is then cooled to a temperature of about 75 to 85° C. Once the epoxy mixture has cooled, the latent hardener, liquid PU toughener if not already added, other optional components (e.g., other tougheners, fillers or the like) and soluble latent catalyst may be added to the mixture, and then mixed for a sufficient amount of time to disperse the latent hardener and PU toughener into the epoxy resin composition. A wide range of mixing conditions can be employed to achieve dispersion of the latent hardener and catalyst and PU toughener solubilization. In mixing the latent hardener particles into the epoxy mixture it is important that the particles be homogeneously dispersed and that agglomeration of the particles is reduced or prevented. To prevent agglomeration, the inventors have found that incorporation of the particles into a paste formed of a portion of the epoxy resin composition may help improve dispersion of the particles into the final epoxy resin composition.

Once prepared, the epoxy resin composition may be infused into a fibrous material to form a prepreg by any suitable method. The prepreg is comprised of the uncured epoxy resin composition and fibers. The fibers comprise at least about 50% by volume of the prepreg and desirably comprise at least 60% or even 70% of the volume of the prepreg.

A wide variety of fibers may be used as the fibrous material. For example, the fibers may comprise carbon fibers, graphite fibers, glass fibers, ceramic fibers, aramid fibers, natural fibers (such as basalt, hemp, seagrass, hay, flax, straw, jute, or coconut).

Preferably, the fibrous material comprises carbon fibers that are arranged in tows. The "tows" (sometimes referred to as "rovings" or simply "fibers") are multifilament fibers. The number of filaments per tow may be, for example, 100 to 30,000. The tows should be thermally and chemically stable under conditions of prepreg formation (e.g., curing of the epoxy resin composition).

Typically the fibers will have a circular or almost circular cross-section with a diameter in the range of from 0.5 to 30 microns, preferably from 2 to 20 microns, and more preferably, from 2 to 15 microns. In terms of weight, the individual tows may have a weight of, for example, 200 to 3,000 g/1000 meters, 600 to 2,000 g/1000 meters, or 750 to 1750 g/1000 meters.

Examples of suitable carbon fibers include Aksaca 3K A-38, 6K A-38, 12K A-42, 24K A-42, 12 K A-49 and 24 K A-49 carbon fibers available from Dow Aksa Ileri Kompozit Malzemeler Saai Ltd, Sti, Istanbul, Turkey. These product designations indicate the approximate number of filaments/roving in thousands (3K being 3,000 filaments, for example), and the approximate tensile strength of the fibers in hundreds of MPa (A-38 indicating a tensile strength of 3,800 MPa).

The fibers may be unidirectional, bidirectional or multi-directional depending on the desired properties required in the final fiber reinforced composite. The fibrous material may be in the form of tows or fabrics and may be in the form of random, knitted, non-woven, multi-axial (e.g., non-crimped fabric or mats), braided or any other suitable pattern.

For structural applications, it is generally preferred that the prepreg comprises a plurality of stacked layers of fibers in which the fibers of each individual layer are unidirectional in orientation. By "unidirectional" it is meant that the reinforcing tows in an individual layer in the prepreg are aligned substantially parallel to each other. In a preferred embodiment, the prepreg comprises a plurality of stacked layers of aligned fibers that are infused with the epoxy resin composition.

When unidirectional fiber layers are used, the orientation of the fiber may be the same or vary throughout a prepreg stack to form a so called non-crimp fabric (NCF). However, this is only one of many possible orientations for stacks of unidirectional fiber layers. For example, unidirectional fibers in neighboring layers may be arranged orthogonal to each other in a so-called 0/90 arrangement, which signifies the angles between neighboring fiber layers. Other arrangements, such as 0/+45/−45/90 are of course possible, among many other arrangements. In one embodiment, the fibrous material comprises a braided or non-crimp fabric having a basis weight from 150 to 2,000 g/m$^2$, and in particular from 300 to 1600 g/m$^2$.

Prepregs in accordance with embodiments of the present invention may be produced by infusing the fibrous material with the epoxy resin composition. As discussed previously, the epoxy resin composition has a $T_{g,0}$ that is from 0 to 20° C., and preferably from 5° C. to 10° C. Advantageously, this allows the epoxy resin composition to be rapidly infused into the fibrous material while minimizing and reducing void spaces (e.g., pockets of air bubbles) within the prepreg. In addition, the infusion process may be carried out at an elevated temperature so that the viscosity of the epoxy resin composition is further reduced. However it must not be so hot for sufficient length of time that an undesirable level of curing of the epoxy resin composition occurs.

In a preferred embodiment of the invention, the infusion of the epoxy resin composition into the fibrous material is carried out at temperatures in the range of from 110 to 125° C., with a range of 115 to 122° C., and in particular, a temperature of 120° C. being more preferred. It should be recognized that temperature ranges outside the above ranges may also be used. However, the use of higher or lower infusion temperatures typically requires adjusting the machine speed at which the infusion process is carried out. For example, at temperatures greater than about 120° C., it may be necessary to carry out the infusion process at a higher machine speed in order to reduce the duration of time to which the epoxy resin composition is exposed to an elevated temperature to avoid undesirable crosslinking of the epoxy resin composition.

Similarly, to obtain a desired level of infusion and thereby decrease void spaces in the prepreg, the use of lower infusion temperatures will typically require a lower machine speed for infusing the epoxy resin composition into the fibrous material. In a preferred embodiment, the void volume of the prepreg and resultant epoxy fiber reinforced composition is at most about 1%.

Typically the epoxy resin composition will be applied to the fibrous material at a temperature in this range and consolidated into the fibrous material by pressure such as that exerted by passage through one or more pairs of nip rollers.

An aspect of the invention is a process of preparing prepregs in accordance with embodiments of the invention. In a first step, the epoxy resin composition is extruded onto a sheet material to form a thin film coating thereon. The sheet material comprises a release film or paper from which the film coating of the epoxy resin composition may be transferred to the fibrous material during the prepregging process. After the film of the epoxy resin composition has been deposited on the sheet material, the sheet material with the film coating may be passed over a chill roll to cool the epoxy resin composition. The sheet material is then typically wound on a roll for future use.

In a second step of the process, the sheet material having the epoxy resin composition film coating is brought into contact with a surface of a fibrous material (e.g., NCF, braided, or unidirectional fabric) and is then subjected to pressure to infuse the epoxy resin into the fibrous material. Preferably, the fibrous material and the sheet material comprising the epoxy resin composition are provided as continuous tapes from respective supply rolls.

In a preferred embodiment, the sheet of fibrous material is sandwiched between two sheet materials on which film coatings of the epoxy resin composition are deposited. The sandwiched materials are then subjected to heating to raise the temperature of the epoxy resin composition. In one embodiment, this heating may be accomplished by passing the combination of the fibrous material and the epoxy resin compositions over a heated plate. Preferably, the epoxy resin composition is heated to a temperature of about 120° C. to facilitate rapid infusion of the epoxy resin composition into the fibrous material. Next, the combination is passed through a pair of nip rolls that press the epoxy resin compositions into the fibrous material from opposite surfaces.

In a preferred embodiment, the combination of the fibrous material and the epoxy resin compositions are subjected to a second step of passing the combination over a heated plated followed by passing the combination through a second nip to further infuse the epoxy resin composition into the fibrous material to form a resin infused prepreg. The prepreg may then be cooled, for example, by passing the material over a chill roll or a chill plate. After cooling, the prepreg may be wound onto a supply roll for future use.

Preferably, the release paper or film on which the epoxy resin composition was coated as a film is rewound on a roll following the step of cooling the epoxy resin composition.

As discussed above, the infusion step may be performed at an elevated temperature to lower the viscosity of the epoxy resin composition. In addition, the infused epoxy resin composition may be subjected to a partial curing step (advancement) to raise the glass transition temperature of the epoxy resin composition in the prepreg. The prepreg may then be packaged, stored, or shipped as required.

As discussed previously, in some embodiments it may also be desirable to subject the prepreg to an advancement step to raise the $T_g$ of the epoxy resin and thereby lower the tack of the prepreg.

The epoxy fiber reinforced composite may then be made by shaping one or more prepregs and subjecting the prepreg or prepregs to sufficient temperature and time to cure the epoxy and phase separate the PU toughener so as to realize an epoxy fiber reinforced composite comprising a cured epoxy resin matrix having therein reinforcing fibers, wherein the fibers comprise greater than 50% by volume of said composite and the epoxy resin matrix has a phase that is comprised of liquid polyurethane toughener that has been reacted with the epoxy resin matrix and said liquid polyurethane toughener has phase separated into particles ranging in size between 50 nm and 2 micrometers dispersed within the cured epoxy matrix as further described above. Preferably, the particles are at most about 1.5, 1.2 or 1 micrometer as determined by atomic force microscopy described in the Examples. Desirably the void volume of the epoxy fiber reinforced composite is at most about 1%.

The temperature may be any that activates the catalyst and hardener employed and typically is greater than 100° C. to 250° C. for as short a practicable time as possible to fully cure the epoxy resin (e.g., seconds to 60 minutes). Pressure may be applied as the epoxy resin composition cures, for example, to retain the shape of the prepregs as they cure.

In an embodiment of the epoxy fiber reinforced composite, the cured epoxy resin matrix has a solid rubber toughener, such as the core shell rubber tougheners described above, having a particle size between 50 nm and 500 nm. The solid rubber toughener may be mono modal, bi-modal or multi-modal. Modal means that there are distinct peaks within the particle size distribution between 50 nm and 500 nm.

In an embodiment, the liquid polyurethane toughener particles are uniformly dispersed throughout the epoxy resin matrix including between the fibers in the stacked layers and between the stacked layers. Likewise, the solid rubber toughener is uniformly dispersed throughout the epoxy resin matrix including between the fibers in the stacked layers and between the stacked layers too. In such composites the amount of the solid rubber generally is present in an amount of 1.0% to 7.5% by weight of the cured epoxy resin matrix and the liquid polyurethane rubber is present in an amount of 1% to 7.5% by weight of the cured epoxy resin matrix. Greater amounts of either toughener tends to cause either aggregation of particles or the PU toughener particles may have a fraction of larger particles, for example, which may bridge the space between fibers.

Examples

The materials used in the epoxy resins are shown in Table 1 and as described below. All percentages are by weight unless indicated otherwise. All physical property and compositional values are approximate unless indicated otherwise.

TABLE 1

| Name | Supplier | Chemistry |
| --- | --- | --- |
| D.E.N. 438 | Olin Corporation | Epoxy novolac resin |
| D.E.R. 6508 | Olin Corporation | Oxazolidone-based Solid epoxy resin |
| D.E.R. 331 | Olin Corporation | Liquid epoxy resin (LER) |
| LICOLUB WE-4 | Clariant International Ltd. | Waxy mold release agent |
| DYHARD 100SF | AlzChem AG | Dicyandiamide reduced to a median particle size ~2.5 micrometers (DICY) |
| OMICURE U410 | CVC Thermoset Specialties, an Emerald Performance Materials Company | Toluene bis-dimethyl urea (TBDMU) |
| KANE ACE MX 153 | Kaneka Americas Holding Inc. | 33% core-shell rubber solution in epoxy resin |
| PU Toughener 1 | Not Applicable | Polyurethane prepolymer; U.S. Pat. No. 5,278,257: example 13 |
| PU Toughener 2 | Not Applicable | Polyurethane prepolymer (see below) |

PU Toughener 1 was prepared in the manner described in Example 13 of U.S. Pat. No. 5,278,257. PU Toughener 2 was prepared as follows. 58.73 g of a 1000 (Mw "weight average molecular weight") molecular weight difunctional polyether polyol (polytetrahydrofuran based) is poured into a vessel. 22.25 g of hexamethylene diisocyanate and 0.48 g trimethoxypropane are added and the mixture is heated to 60° C. Then 0.2 g dibutyltin-dilaurate is added. An exothermic reaction starts, and the temperature increases up to 80-90° C. Stirring is continued until reaction is completed. After the mixture is cooled down to 60° C., 18.34 g 2-allylphenol is added. The solution is stirred at 80° C. for 30 minutes. The primary difference between PU Toughener 1 and 2 is the resulting solubility parameter of the toughener which affects the compatibility with the epoxy resin.

Epoxy Formulation and Clear Cast Preparation

The epoxy resin formulation was prepared by preparing the A- and B-sides separately and mixing before use. The A-side consists of D.E.N. 438, D.E.R. 6508, Licolub WE-4, and the PU Tougheners as noted in Table 3. The B-side consists of D.E.R. 331, the core-shell rubbers, Dyhard 100SF (DICY), and Omicure U410 "TBDMU" (see formulation in Table 3). The components of the A-side are weighed into a Flaktec speed mixer cup and placed in the oven at 120° C. for at least 1 hour in order to melt the solid epoxy resin. The A-side is then mixed by hand with a tongue depressor to incorporate the epoxy resins and internal mold release. The A-side is placed back into the oven and mixed again after some time. The A-side is kept in the oven overnight to promote thermal degassing of the resin which results in lower clear cast void content. The components of the B-side are weighed into another speed mixer cup with 20% excess (1.2 eq) and mixed using a dual-axis speed mixer (FlackTec Inc., Landrum, S.C., Model DAC 150 FLZ-K) at 2000 rpm until visually homogeneous (typically 1-2 minutes) ensuring that the mixture does not exceed ~50° C.

To combine the A- and B-sides of the epoxy formulation, calculated amount of B-side is weighed into the hot A-side and the entire formulation is mixed in a dual-axis speed mixer at 850 rpm for 30 sec followed by 1650 rpm for 30 sec. The mixed formulation is poured onto a baking sheet lined with Teflon release paper to cool. The resulting solid epoxy formulation is stored in the freezer until use for epoxy clear casts or composite preparation.

Epoxy clear cast plaques (without any reinforcing fillers or fibers) were prepared by compression molding using a Wabash MPI platen press (G302H-18-CLX). A 6"×6"×⅛" mold was used to prepare the plaques and the epoxy resin was charged with a 5% mass excess (based on the density). The plate and mold assembly consisted of (from bottom to top) a steel plate, a foil sheet for surface finish, a Teflon-coated release liner, the mold and epoxy charge, Teflon-coated release liner, a foil sheet for surface finish, and a steel plate. The platen press was pre-heated to 100° C. and the molding assembly was placed in the press, and allowed to preheat for 30 sec prior to starting the molding cycle. The details of the molding cycle are given in Table 2. The soak at 100° C. allows enough time for the epoxy to flow and fill the mold prior to the onset of the curing reaction. This soak time aids in the preparation of void-free clear cast plaques for testing. After the molding cycle, the cured epoxy plaque was removed from the molding assembly.

TABLE 2

| Step | Temperature | Time | Pressure | Purpose |
|---|---|---|---|---|
| 1 | 100° C. | 10 min | 25 tons | Soak |
| 2 | 100 → 150° C. | 10 min | 25 tons | Heat ramp |
| 3 | 150° C. | 10 min | 25 tons | Cure |
| 4 | 150 → 37° C. | 12 min | 25 tons | Cool |

Composite Preparation

Composites were prepared by filming epoxy resin onto release paper, infusing the epoxy resin into the carbon fiber fabric, and curing in a compression mold. The epoxy resin was formulated as above and filmed into release paper with a thickness of 0.008" by setting a spacer height using a resin bath temperature of ~75° C. The epoxy resin film was cut into ~7 ft long lengths and a 7 ft length of carbon fiber fabric was placed on top of one of the films (A-49 stitched UD fabric from DowAksa). The remaining epoxy film was placed on top of the first epoxy film and carbon fiber fabric. These layers were then passed over a heated bed (115° C.) and through heated rollers (~95-100° C.) set to a gap of 0.025" to infuse the epoxy resin into the carbon fiber fabric. Six 12"×12" plies were cut from the 7 ft length of prepreg material and were assembled for molding with 0° orientation.

The composites were molded in a compression mold at 150° C. temperature for lower and upper mold, 0.2 in/sec closing speed, 15 sec hold time, 28 tons applied pressure during hold, and 180 tons applied pressure during molding, for a total cycle time of 3 minutes. The composites were then cut to specific specimen sizes using a tile saw.

Test Methods

Epoxy Formulation Viscosity

The viscosity testing in epoxy formulation experiments were performed using a TA Instruments ARES-G2 Rheometer with 25 mm aluminum disposable plate with drip edge on the lower fixture and 8 mm aluminum disposable plate on the upper fixture. The instrument was set-up for an oscillation temperature ramp test from 50° C. to 150° C. 10° C./min, 1 rad/s frequency, 5% strain, sampling rate of 1 Hz, and the environmental chamber was set to oven gas. The accessory thermocouples were used on both the upper and lower sides of the geometry so that the sample temperature was taken from contact points on the reverse sides of the upper plate and the lower plate. After installing the thermocouples and geometry, the gap was zeroed at room temp, and the axial force and torque were balanced. The environmental test chamber temperature (ETC) was set to 50° C. and the geometry was allowed to equilibrate. The epoxy formulations were stored in a freezer at −20 C before taking a solid piece off for testing, and then placed on the lower plate geometry centered under the contact point. The sample was allowed to warm up to 50° C. and the upper plate was lowered until contact was made with the surface of the material resulting in a 2-4 mm gap. Once the temperature was stable at 50° C., the test was started. Although the experiment final temperature was set to 150° C., the test was always stopped early to prevent overloading the transducer as the epoxy cures above 120° C. Once the drastic viscosity increase is observed and G' and G" exceeded 104 Pa·s, the test was stopped to avoid damage to the transducer. Finally, the upper fixture was unscrewed from the instrument, and the fixture body with thermocouple attached was moved all the way up to allow the fixture to be removed freely. The disposable plates were then replaced for the next test.

Epoxy Clear Cast and Composite Tensile Testing

Tensile properties, including stress at break (MPa), strain at break (%), and tensile modulus (Young's modulus, GPa), were determined using ASTM D3039 Tensile Properties of Polymer Matrix Composite Materials. Epoxy specimens were cut from molded plaques with typical dimensions of 0.5"×6". Composite specimen dimensions were 25×175 mm and cut in the transverse direction (normal to fiber reinforcement). Specimens were tested at room temperature (23° C.) using a servo-hydraulic test frame WITS Model 8801 with a 444 kN load cell and a pair of hydraulic grips. The specimens were gripped at the two ends with grips covering a length of 25 mm at each end, and the pressure of the hydraulic grips was set to approximately 1500 psi. An extensiometer (MTS 632.12B-20) with 25.4 mm gage was positioned in the central portion of the specimen for accurate measure of the deformation. The load cell was calibrated, and the load was zeroed (after mounting of the grips, before testing). The tensile tests were run in displacement-control mode with a crosshead displacement rate of 0.05 in/min until failure of the specimen. Data acquisition frequency was set at 25 Hz. Elastic modulus was calculated as described in ASTM D3039 between the strain level 0.1 and 0.3%. At failure of the specimen, the crosshead displacement was stopped and the extensiometer and specimen were removed. Instrument software was used to determine the tensile modulus, stress at break, and strain at break.

Epoxy Clear Cast PU Toughener Domain Size (Atomic Force Microscopy "AFM")

Cross-sectioned samples for microscopy were punched from epoxy clear cast plaques and mounted in vice holders for cryo milling at −120° C. Final polishing of the sample was achieved by cryomicrotomy of the block face at −80° C. Peak force tapping AFM images were obtained using a Bruker Icon with Nanoscope V controller (software v8.15 and Bruker TAP150A cantilevers. The following settings were used for image acquisition: noise threshold: 0.5 nm, scan asyst auto gain: on, scan asyst auto setpoint: on, scan asyst auto scan rate: off, scan asyst auto z limit: off, PR amplitude: 300, DMT mod limit: 4, Z range: 4, PF engage setpoint: 0.1. Some samples were imaged using Fast scan tapping mode with the following settings: A0: 140, Asp/Esp: 0.8, Scan Rate (Hz): 14, Lines: 1024, amplitude range (fs): 4000, cantilever: fastscan A. All images were acquired at 10 μm×10 μm with 1024 lines resolution and produced using SPIP v6.4.2 software. A 2nd order average plane fit with a zero order LMS and mean set to zero plane fit was used.

For each sample, four 20 μm×20 μm AFM stiffness images were analyzed to determine the PU domain size. ImageJ (NIST) was used to threshold the images for PU domain detection and particle analysis of each image was performed and the resulting domain sizes were averaged over all images for a given formulation.

Composite Interlaminar Shear Strength

The apparent interlaminar shear strength (ILSS) was determined using ISO 14130 Fibre-reinforced plastic composites—Determination of apparent interlaminar shear strength by short-beam method. Specimens were cut from molded plaques along the fiber direction. Five specimens were cut and tested at room temperature (23° C.) using an electro-mechanical Instron Model 5967 test frame with a 5 kN load cell. A 5 kN capacity three-point bend fixture (Instron 3-point bend fixture, part #2810-400) was used with a support diameter of 4 mm, a loading nose diameter of 10 mm, and a span set at 5× the specimen thickness (10 mm or 13.5 mm). The load cell was calibrated and the load zeroed after mounting of the fixture, before testing. The ILSS (3-point bend) tests were run in displacement-control mode with a crosshead displacement rate of 1.0 mm/min until failure of the specimen. Data acquisition frequency was set to 20 Hz. At failure of the specimen, the crosshead displacement was stopped, and the specimen was removed. Instrument software was used to determine the apparent ILSS, along with the average and standard deviation. The specimen was examined to determine the failure mode (single shear, multiple shear, compressive, tensile, or plastic shear).

Flexural Testing

Flexural properties, flexural strength (MPa), were determined by ASTM D7264, Flexural Properties of Polymer Matrix Composite Materials, Procedure A with a three-point loading system. This method is applicable to the determination of flexural strength and stiffness of polymer matrix composites.

Specimens were machined from molded plaques and were not tabbed. Longitudinal specimens were cut with dimensions of 13 mm×102 mm×~4 mm (thickness). A minimum of five specimens were cut and tested at room temperature (23° C., 50% RH) using a Zwick/Roell Z010 Material Testing Machine and a three-point bend fixture with a span of 3 inches and radius of supports and nose of 6 mm. The load cell was calibrated and zeroed after mounting the fixture and before testing. The flexural tests were run at a crosshead speed of 0.031 inches/minute until failure of the specimen. The maximum flexural stress is calculated from the load-deflection curve by the instrument software.

The data in Table 3 shows that a PU toughener can give the required balance of increased toughness with little or no increase in viscosity particularly in combination with a core shell rubber toughener (CSR) (Example 1). Comparative Example 1 is the un-toughened resin. Comparative Example 2 consists of only core shell rubber toughener. Although this toughener gives a good improvement in neat resin toughness, the formulation viscosity is greatly increased. Comparative Example 3 uses PU toughener 1, which has a particle size that is too large (substantial amount of particles greater than 2 micrometers) and the viscosity increase is low, but the improvement in toughness is only marginal even in the neat cured epoxy resin. The toughener combination in Comparative Example 4 (CSR and PU toughener) exhibits high toughness, but also a high viscosity in the neat cured epoxy resin (no fibers). Example 1 shows a composition with PU toughener 2 where the toughness remains high and the viscosity remains below the acceptable limit (100 Pa·s).

A direct comparison of the mechanical properties of epoxy clear casts and unidirectional composites is also shown at the bottom of Table 3. Although the improvement in tensile toughness of the neat resin clear casts was comparable for Comparative Example 4 and Example 1, the transverse tensile strength at break and transverse tensile strain at break of the fiber reinforced composite is substantially improved for Example 1 (the only difference being the PU toughener used and resultant particle size thereof. Likewise the same trend follows for Comparative Example 5 and Example 2. This is believed to be due to the larger PU domain size formed by PU Toughener 1 after cure, which may have resulted in a poor transfer of toughness from neat resin to the composite. Examining Comparative Example 3 and Example 3 cured epoxy resin properties without the core shell rubber shows that there is a substantial increase in toughness (neat epoxy resin) and the viscosity of the uncured resin is significantly lowered when the PU toughener has the requisite particle size of the invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims, which even though may not depend directly from each and every other, it is understood that any and all combinations are contemplated. Although specific terms are employed herein, they are used in a generic and descriptive sense only and not for purposes of limitation.

TABLE 3

| Example | Comp. Ex. 1 | Comp. Ex. 2 | Comp. Ex. 3 | Comp. Ex. 4 | Comp. Ex. 5 | Ex. 1 | Ex. 2 | Ex. 3 |
|---|---|---|---|---|---|---|---|---|
| DEN 438 | 34.8 | 32.1 | 31.3 | 31.3 | 30.4 | 31.3 | 30.4 | 31.3 |
| DER 6508 | 33.1 | 30.6 | 29.8 | 29.7 | 28.9 | 29.7 | 28.9 | 29.8 |
| DER 331 | 18.6 | 2.0 | 16.8 | 6.6 | 11.2 | 6.6 | 11.2 | 16.8 |
| Licolub WE-4 | 2.2 | 2.0 | 1.9 | 1.9 | 1.9 | 1.9 | 1.9 | 1.9 |
| Dicy | 7.9 | 7.4 | 7.1 | 7.2 | 6.9 | 7.2 | 6.9 | 7.1 |
| TBDMU | 3.5 | 3.2 | 3.1 | 3.1 | 3.0 | 3.1 | 3.0 | 3.1 |

TABLE 3-continued

| Example | Comp. Ex. 1 | Comp. Ex. 2 | Comp. Ex. 3 | Comp. Ex. 4 | Comp. Ex. 5 | Ex. 1 | Ex. 2 | Ex. 3 |
|---|---|---|---|---|---|---|---|---|
| Kane Ace MX 153 | 0 | 22.7 | 0 | 15.2 | 7.6 | 15.2 | 7.6 | 0 |
| PU Toughener 1 | 0 | 0 | 10 | 5 | 10 | 0 | 0 | 0 |
| PU Toughener 2 | 0 | 0 | 0 | 0 | 0 | 5 | 10 | 10 |
| Epoxy properties | | | | | | | | |
| Formulation Viscosity (Pa·s @ 100° C.) | 35.1 | 116 | 51.1 | 133 | 86.1 | 83.9 | 67.9 | 33.7 |
| Tensile Toughness (MPa) | 0.327 | 1.03 | 0.343 | 1.25 | 1.18 | 1.06 | 0.514 | 0.677 |
| PU domain diameter (μm) | — | — | 1.51* | 1.25* | 1.54* | 0.48+ | 0.71+ | 0.58# |
| Composite properties | | | | | | | | |
| Apparent ILSS (MPa) | — | — | — | 64.0 | 56.4 | 64.6 | 56.5 | — |
| Flexural Strength (MPa) | — | — | — | 1161 | 1182 | 1205 | 1177 | — |
| Transverse tensile stress at break (MPa) | — | — | — | 21.1 | 19.1 | 24.8 | 26.6 | — |
| Transverse tensile strain at break (%) | — | — | — | 0.28 | 0.22 | 0.34 | 0.38 | — |

*Average particle size with substantial amount of particles exceeding 2 micrometers.
+Average particles size with no particles exceeding 2 micrometers by number.
Average particles size with less than 5% of particles exceeding 2 micrometers by number.

The invention claimed is:

1. An epoxy resin composition comprising
An epoxy resin comprised of a solid epoxy resin and a liquid epoxy resin, wherein the solid epoxy resin is comprised of an epoxy resin containing oxazolidone;
a liquid polyurethane toughener that is dissolved in the epoxy resin and, upon curing of the epoxy resin, the liquid polyurethane toughener phase separates into particles having a particle size of 50 nm to 2 micrometers;
an epoxy hardener, wherein the epoxy hardener is dicyandiamide particles having a particle distribution in which 98 percent of the dicyandiamide particles have a diameter less than 10 microns, and at least 35% of the dicyandiamide particles have a particle size of less than 2 microns; and
an epoxy soluble latent catalyst.

2. The epoxy resin composition of claim 1, wherein the solid epoxy resin comprises from 19 to 54 weight percent, the amount of liquid epoxy resin is from 11 to 61 weight percent based on the total weight of all epoxy resin components in the epoxy resin composition.

3. The epoxy resin composition of claim 1, wherein the liquid epoxy resin is comprised of at least one of a diglycidyl ether of bisphenol A and an epoxy novolac resin.

4. The epoxy resin composition of claim 1, wherein the liquid polyurethane toughener phase separates into particles having a particle size of 50 nm to 1.5 micrometers.

5. The epoxy resin composition of claim 1, wherein the liquid polyurethane toughener is present in an amount of 1% to 10% by weight of the epoxy resin composition.

6. The epoxy resin composition of claim 1, wherein the epoxy resin composition as an uncured glass transition temperature ($T_{g,0}$) from 5 to 15° C., and a cured glass transition temperature ($T_{g,c}$) from 150 to 160° C.

7. The epoxy resin composition of claim 1 further comprising a solid rubber toughener having a particle size between 25 nm to 500 nm, wherein the solid rubber toughener has a particle size distribution that is bimodal or multimodal.

8. The epoxy resin composition of claim 1, wherein the amount of the latent catalyst in the epoxy resin composition is present at a level of 1 to 7 parts per hundred parts epoxy resin, and the latent hardener is present in an amount relative to the total amount of epoxy components in the epoxy resin composition corresponding to an epoxy/hardener equivalent ratio from 0.5 to 3.

9. The epoxy resin composition of claim 1, wherein the viscosity of the epoxy resin composition is less than 100 Pas at 100° C.

10. The epoxy resin composition of claim 9, wherein the viscosity of the epoxy resin composition has a viscosity less than a corresponding epoxy resin composition failing to contain the liquid polyurethane toughener.

11. A prepreg comprising the epoxy resin composition of claim 1 impregnated into a fibrous material wherein the fibrous material comprises greater than 50% of the prepreg by volume, and wherein the prepreg has a total void volume that is less than 1% by volume.

12. The prepreg of claim 11, wherein the fibrous material comprises carbon fibers, and wherein the fibrous material comprises a plurality of stacked layers of non-crimped fabrics.

13. The prepreg of claim 12, wherein the prepreg has been partially cured so that the glass transition temperature of the prepreg ($T_{g,p}$) is from 12 to 25° C.

14. An epoxy fiber reinforced composite comprising a cured epoxy resin matrix prepared with the epoxy resin composition of claim 1 and also having therein reinforcing fibers, wherein the fibers comprise greater than 50% by volume of said composite and the epoxy resin matrix has a phase that is comprised of liquid polyurethane toughener that has been reacted with the epoxy resin matrix and said liquid polyurethane toughener has phase separated into particles ranging in size between 50 nm and 2 micrometers dispersed within the cured epoxy matrix, wherein the epoxy fiber reinforced composite has a total void volume of at most about 1%.

15. The epoxy fiber reinforced composite of claim 14, wherein the cured epoxy resin also has therein a solid rubber toughener having a particle size between 50 nm and 500 nm.

16. The epoxy fiber reinforced composite of claim 15, wherein the solid rubber toughener has a bimodal or multimodal size distribution, and wherein the solid rubber toughener is a core shell rubber toughener.

17. The epoxy fiber reinforced composite of claim 15, wherein the solid rubber toughener is a core shell rubber toughener.

18. The epoxy fiber reinforced composite of claim 15, wherein the solid rubber is present in an amount of 1.0% to 7.5% by weight of the cured epoxy resin matrix and the liquid polyurethane rubber is present in an amount of 1% to 7.5% by weight of the cured epoxy resin matrix.

19. The epoxy fiber reinforced composite of claim 14, wherein the reinforcing fibers comprise carbon fibers, and wherein the reinforcing fibers are a plurality of stacked layers of non-crimped fabrics.

\* \* \* \* \*